US009135261B2

(12) United States Patent
Maunder et al.

(10) Patent No.: US 9,135,261 B2
(45) Date of Patent: Sep. 15, 2015

(54) SYSTEMS AND METHODS FOR FACILITATING DATA DISCOVERY

(75) Inventors: Anurag S. Maunder, Fremont, CA (US); Christos Tryfonas, San Carlos, CA (US); Muddu Sudhakar, Milpitas, CA (US)

(73) Assignee: EMC CORPORATION, Hopkinton, MA (US)

( * ) Notice: Subject to any disclaimer, the term of this patent is extended or adjusted under 35 U.S.C. 154(b) by 336 days.

(21) Appl. No.: 12/638,067

(22) Filed: Dec. 15, 2009

(65) Prior Publication Data

US 2011/0145217 A1    Jun. 16, 2011

(51) Int. Cl.
G06F 17/30    (2006.01)

(52) U.S. Cl.
CPC .... G06F 17/30106 (2013.01); G06F 17/30094 (2013.01)

(58) Field of Classification Search
CPC ................ G06F 17/30864; G06F 17/30132; G06F 17/30522; G06F 12/0862; G06F 2212/6024; Y10S 707/99932
USPC ........ 707/999.003, 999.005, 999.1, 705, 706, 707/709, 710, 736, 741, 755, 756, 790, 707/791; 709/200, 204, 206, 207; 705/1; 726/22; 713/188
See application file for complete search history.

(56) References Cited

U.S. PATENT DOCUMENTS

| | | | | |
|---|---|---|---|---|
| 5,978,841 A * | 11/1999 | Berger | .......................... | 709/217 |
| 6,643,641 B1 * | 11/2003 | Snyder | .......................... | 707/709 |
| 6,704,835 B1 * | 3/2004 | Garner | .......................... | 711/103 |
| 6,741,996 B1 | 5/2004 | Brechner | | |
| 7,080,073 B1 * | 7/2006 | Jiang et al. | ............................ | 1/1 |
| 2003/0050974 A1 * | 3/2003 | Mani-Meitav et al. | ....... | 709/203 |
| 2003/0135487 A1 * | 7/2003 | Beyer et al. | ........................ | 707/3 |
| 2004/0148484 A1 * | 7/2004 | Watanabe et al. | ............. | 711/170 |
| 2005/0138084 A1 * | 6/2005 | Azagury et al. | .............. | 707/200 |
| 2006/0053157 A1 | 3/2006 | Pitts | | |
| 2006/0282494 A1 | 12/2006 | Sima et al. | | |
| 2007/0156677 A1 * | 7/2007 | Szabo | ............................... | 707/5 |
| 2007/0288696 A1 * | 12/2007 | Repasi et al. | ................. | 711/135 |
| 2008/0059734 A1 * | 3/2008 | Mizuno | ......................... | 711/162 |

(Continued)

FOREIGN PATENT DOCUMENTS

EP    1564661 A2    8/2005

OTHER PUBLICATIONS

International Search Report and Written Opinion dated Dec. 6, 2010.

(Continued)

Primary Examiner — Dennis Truong
(74) Attorney, Agent, or Firm — Dergosits & Noah LLP; Todd A. Noah

(57) ABSTRACT

A system for facilitating data discovery on a network, wherein the network has one or more data storage devices. The system may include a crawler program configured to select at least a first set of files and a second set of files, each of the first set of files and the second set of files being stored in at least one of the one or more data storage devices. The system may also include a data fetcher program configured to obtain a copy of the first set of files, the data fetcher program being further configured to resist against obtaining a copy of the second set of files. The system may also include circuit hardware implementing one or more functions of one or more of the crawler program and the data fetcher program.

22 Claims, 3 Drawing Sheets

(56) References Cited

U.S. PATENT DOCUMENTS

2008/0140626 A1* 6/2008 Wilson .............................. 707/3
2008/0243879 A1* 10/2008 Gokhale et al. ............... 707/100
2008/0250024 A1* 10/2008 Kvm et al. ...................... 707/10
2008/0263257 A1* 10/2008 Cain, III et al. ................... 711/3

OTHER PUBLICATIONS

Supplementary European Search Report dated Jan. 9, 2014 in corresponding European Application No. 10838050.2.

* cited by examiner

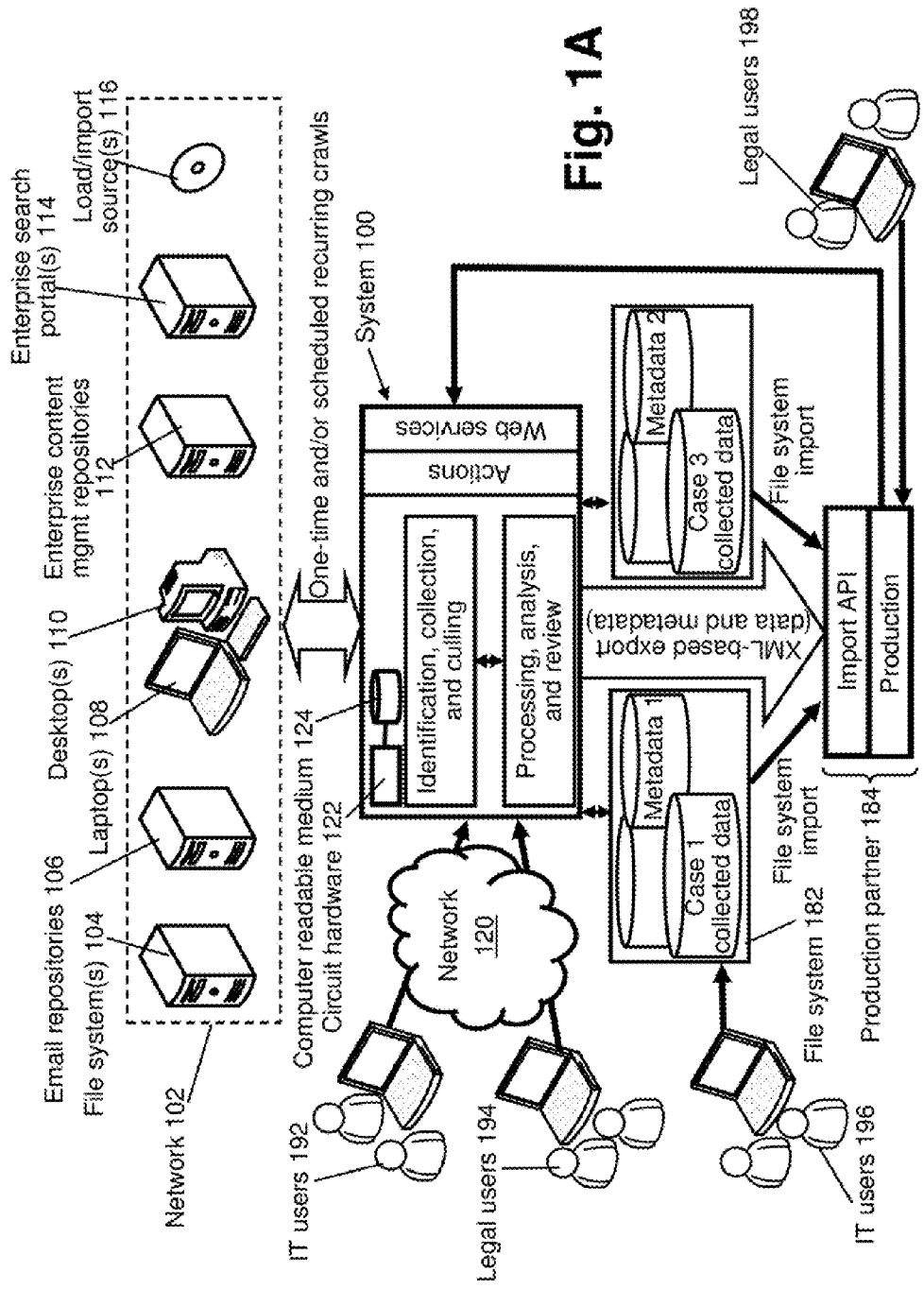

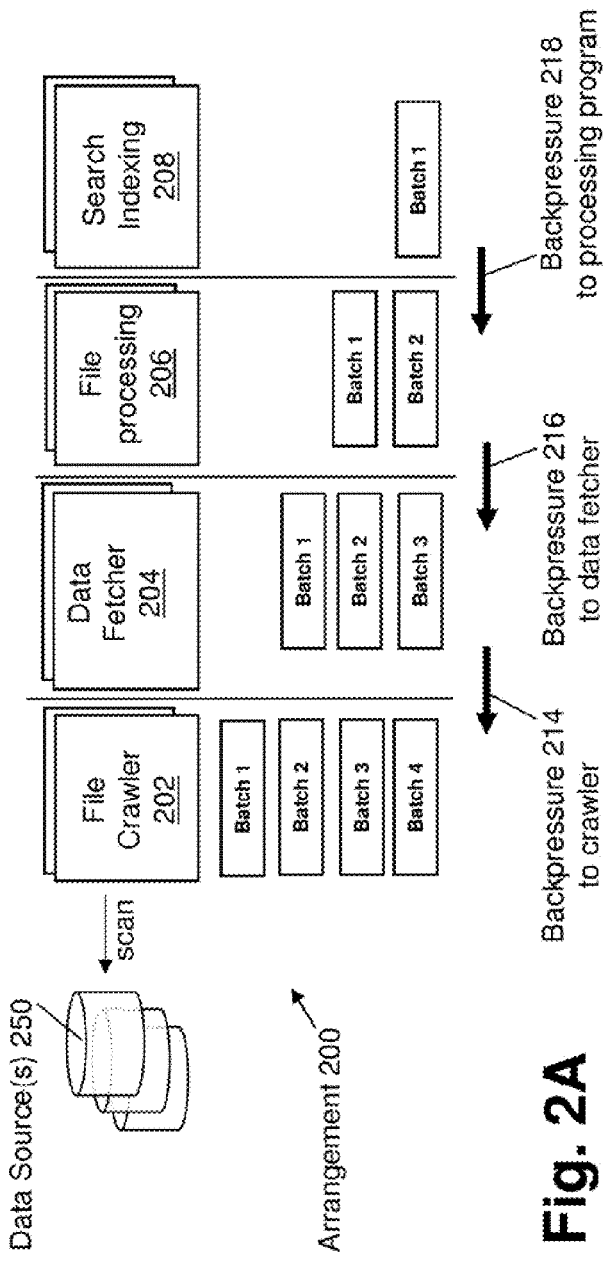

SYSTEMS AND METHODS FOR FACILITATING DATA DISCOVERY

BACKGROUND OF THE INVENTION

The present invention relates to data discovery, such as legal data discovery. Organizations today face various challenges related to data discovery. Increased digitized content, retention of data due to regulatory requirements, the prevalence of productivity tools, the availability of data on communication networks, and other factors have been driving rapid growth of data volumes in organizations. In response to the rapid data growth, many organizations have been expanding data storage with various data storage devices and have been implementing data discovery utilizing various tools provided by various suppliers to perform various data discovery tasks. Typically, time scale differences and speed mismatch between the tools and the tasks performed may result in issues such as missed data and latency in responding to data discovery requests.

In general, data discovery may involve tasks such as identification, collection, culling, processing, analysis, review, production, and preservation. Typically the tasks may be performed by different tools provided by different suppliers. For example, the tasks of identification and collection may be performed by an identification-collection tool, and the task of processing may be performed by a separate processing tool coupled to the identification-collection tool. Since identification and collection may be performed substantially faster than processing, the identification-collection tool may unnecessarily collect too much data such that the processing tool may be unable to timely process all the collected data. As a result, a substantial portion of the collected data may be dropped without being processed. Consequently, some critical data may not be appropriately analyzed and preserved. In addition, if the user of the tools expects the data discovery tools to respond to data discovery requests at a speed consistent with the data collection speed, the user may experience substantial latency caused by the delay at the processing tool.

In some arrangements, data may need to be manually transferred between some of the data discovery tools. The manual process may cause a substantial amount of errors in the tools and in the data discovery process.

SUMMARY OF INVENTION

An embodiment of the present invention relates to a system for facilitating data discovery on a network, wherein the network has one or more data storage devices. The system may include a crawler program configured to select at least a first set of files and a second set of files, each of the first set of files and the second set of files being stored in at least one of the one or more data storage devices. The system may also include a data fetcher program configured to obtain a copy of the first set of files, the data fetcher program being further configured to resist against obtaining a copy of the second set of files. The system may also include circuit hardware implementing one or more functions of one or more of the crawler program and the data fetcher program.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A shows a schematic representation illustrating a system for facilitating data discovery and an example operating environment of the system in accordance with one or more embodiments of the present invention.

FIG. 2A shows a schematic representation illustrating an arrangement for facilitating data discovery in accordance with one or more embodiments of the present invention.

FIG. 2B shows a table illustrating conditions for triggering additional coordination between data discovery tasks in facilitating data discovery in accordance with one or more embodiments of the present invention.

DETAILED DESCRIPTION OF EMBODIMENTS

Figure 1B:
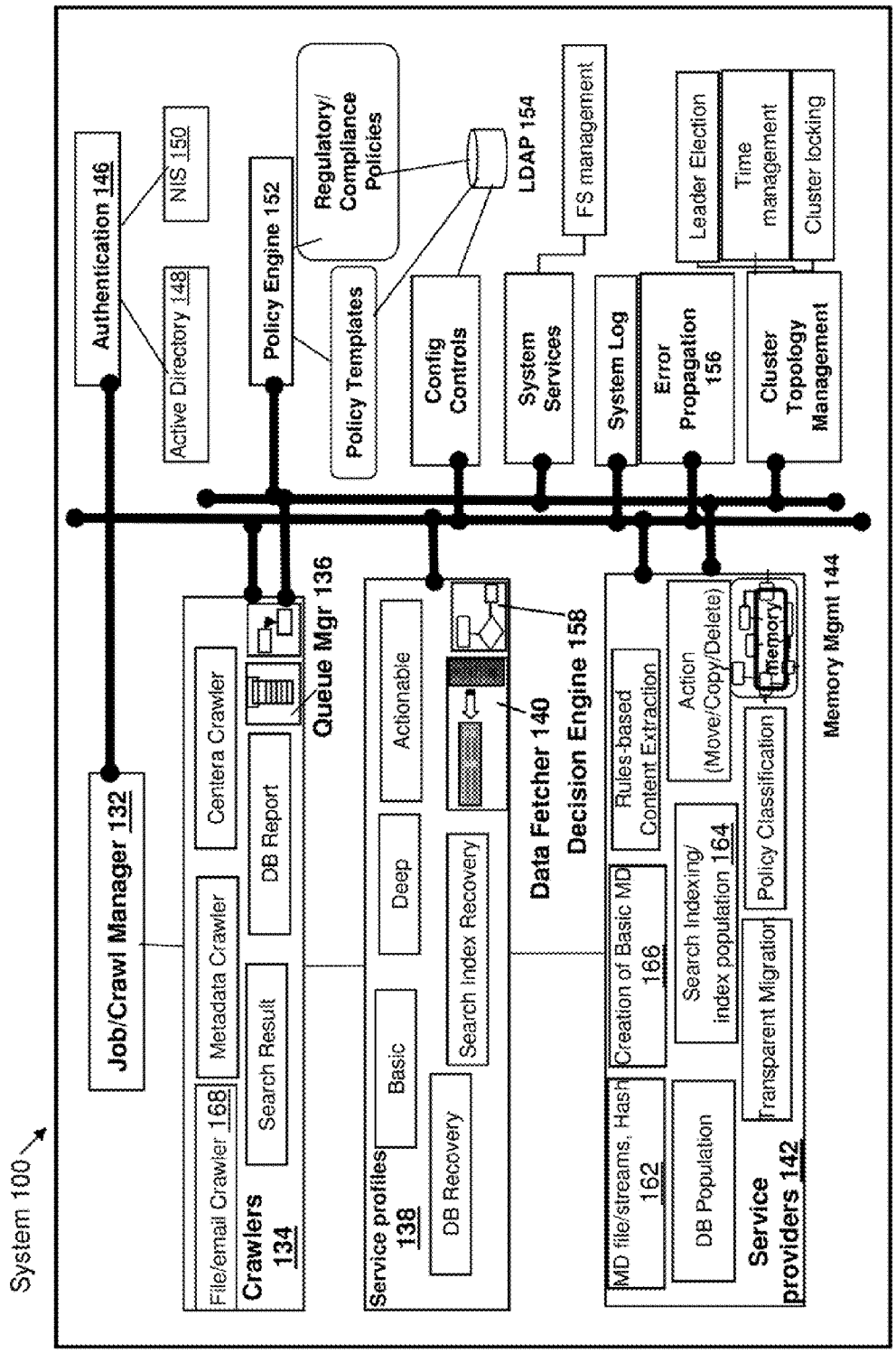
FIG. 1B shows a block diagram illustrating some components of a system for facilitating data discovery in accordance with one or more embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

One or more embodiments of the present invention relate to a system for facilitating data discovery on a network having one or more data storage devices. The system may include a crawler program for scanning batches (or sets) of files to identify relevant data and/or to identify where the data is stored. For example, the batches (or sets) of files may include a first set of files, a second set of files, a third set of files, and a fourth set of files. Each of the first set of files, the second set of files, the third set of files, and the fourth set of files may be stored in at least one of the one or more of the data storage devices on the network.

The system may also include a data fetcher program. The data fetcher program may obtain a copy of the first set of files, a copy of the second set of files, and a copy of the third set of files for subsequent processing. For regulating the speeds associated with different data discovery tasks, the data fetcher program may provide a "backpressure" or resistance (e.g., against the crawling program) to resist against obtaining a copy of the fourth set of files, given that the scanning speed of the crawling program may be substantially faster than the fetching speed of the data fetcher program. The backpressure may be applied by the data fetcher program when one or more conditions are met. For example, a backpressure condition may be that the quantity of files in (the copy of) the first set of files, (the copy of) the second set of files, and/or (the copy of) the third set of files exceeds a file quantity threshold. Advantageously, the scanning speed of the crawling program may be appropriately tuned according to the fetching speed of the data fetcher program, such that dropping of files/data may be prevented.

The system may also include a processing program. The processing program may perform one or more services on the copy of the first set of files and the copy of the second set of files fetched by the data fetcher program. For example, the one more services may include extracting data and/or generating hash codes using the data. For regulating the speeds associated with different data discovery tasks, the processing program may provide a "backpressure" or resistance (e.g., against the data fetcher program) to resist against performing any services on the copy of the third set of files, given that the fetching speed of the data fetcher program may be substantially faster than the processing speed of the processing program. The backpressure may be provided by the processing program when one or more conditions are met. For example, a backpressure condition may be that one or more file formats associated with one of more files of (the copy of) the first set of files and/or (the copy of) the second set of files do not belong to a predetermined set of rile formats. Advantageously, the fetching speed of the data fetcher program may be appropriately tuned according to the processing speed of the processing program, such that dropping of files/data may be prevented.

The system may also include a search indexing program. The search indexing program may generate at least a search index using the copy of the first set of files. For regulating the speeds associated with different data discovery tasks, the search indexing program may provide a "backpressure" or resistance (e.g., against the processing program) to resist against generating any search index from the copy of the second set of files, given that the processing speed of the processing program may be substantially faster than the search index generating speed of the search indexing program. The backpressure may be provided by the search indexing program when one or more conditions are met. For example, a backpressure condition may be that the amount of text to index in the first set of files exceeds a text amount threshold. Advantageously, the processing speed of the processing program may be appropriately tuned according to the search index generating speed of the search indexing program, such that dropping of files/data may be prevented.

The system may also include circuit hardware that may implement one or more functions of one or more of the crawler program, the data fetcher program, the processing program, and the search indexing program. The system may also include a computer readable medium storing one or more of the programs.

By regulating the speeds associated with various data discovery tasks, the system may effectively prevent latency and dropped data in performing data discovery.

The features and advantages of the invention may be better understood with reference to the figures and discussions that follow.

FIG. 1A shows a schematic representation illustrating a system 100 for facilitating data discovery and an example operating environment of system 100 in accordance with one or more embodiments of the present invention. System 100 may perform and/or facilitate data discovery tasks such as one or more of identification, collection, culling, processing, analysis, and review. In contrast with prior art arrangements, system 100 may perform and/or facilitate multiple data discovery tasks in an integrated fashion with coordinated speeds for the tasks. As illustrated in the example of FIG. 1A, system 100 may be coupled with a network 102 for facilitating data discovery on network 102, which may include various data sources, as illustrated by file system(s) 104, email repository/repositories 106, laptop computer(s) 108, desktop computer(s) 110, enterprise content management repository/repositories 112, enterprise search portal(s) 114, and/or load/import source(s) 116 (e.g., compact disks, USB drives, etc.).

System 100 may also be coupled with various terminal devices through a network 120 (e.g., a wide area network), such that authorized users may have access to system 100 for operating and/or maintaining system 100. The users may include information technology (IT) users 192 (such as corporate system engineers) and legal users 194 (such as attorneys and paralegals involved in a particular legal case).

System 100 may also be coupled with one or more file systems, such as file system 182, for preservation of data. IT users 196 may retrieve data from file system 182 for generating particular reports according to specific requirements.

System 100 may also be coupled with one or more production partners, such as production partner 184. System 100 may export data and metadata (e.g., in an XML format) to production partner 184. Additionally or alternatively, production partner 184 may import data and metadata from file system 182 and/or other file systems. Using the data and metadata, production partner 184 may generate reports and/or documents for use by legal users 198. At the same time, production partner 184 also may be a data source, such that the reports and documents generated by production partner 184 may be provided to system 100 for performing relevant data discovery tasks.

System 100 may include various software and hardware components for performing and/or facilitating data discovery tasks in an integrated and coordinated fashion. System 100 may include computer readable media, such as computer readable medium 124, for storing the software components. System 100 may also include circuits, such as circuit hardware 122, for implementing functions associated with the software components. Computer readable medium 124 and circuit hardware 122 may be implemented inside the same enclosure of system 100. Some components of system 100 are discussed with reference to the example of FIG. 1B.

FIG. 1B shows a block diagram illustrating some components of system 100 for facilitating data discovery in accordance with one or more embodiments of the present invention. System 100 may include various functional modules/programs, such as job manager 132, one or more crawlers 134 (or crawler programs 134), a queue manager 136, one or more service profiles 138, a data fetcher program 140, a decision engine 158, one or more service providers 142 (or processing programs 142), and a memory management program 144. The functional modules/programs may be stored in computer readable medium 124 illustrated in the example of FIG. 1.

Job manager 132 may perform one or more of job scheduling, crawling management, and failover management. Job scheduling may involve allowing a user to start/stop/monitor data processing and/or data discovery jobs. Job manager 132 may accept user input through a command-line interface (CLI) and/or a graphical user interface (GUI). For starting jobs, job manager 132 may spawn a crawler in an appropriate node. For stopping/monitoring jobs, job manager 132 may interact with queue manager 136.

Job manager 132 may schedule jobs on a periodical basis or based on a calendar. A main task of these jobs may be to walk through a file hierarchy (local or remote) by utilizing one or more of crawlers 134 to identify location of files/objects, to select files/objects, and/or to perform various actions on selected files/objects.

The distribution of files to be processed may be performed utilizing a set of centralized queues managed by queue manager 136. Queue manager 136 may be implemented in job manager 132, coupled to job manager 132, and/or implemented in a node. Queue manager 136 may distribute the files/load in separate service providers 142 that perform file processing.

The one or more crawlers 134 may include one or more of file/email crawler(s) 168, metadata crawler(s), Centera™ crawler(s), search result logic, database result logic, etc.

In accordance with one or more embodiments of the invention, a crawler may include logic for performing the tasks of enumerating a source data set and applying any filters/policies as required for determining the objects (or files) that are eligible candidates for processing. The crawler may scan files according to one or more of NFS (Network Filesystem) and CIFS (Common Internet Filesystem) protocols. The crawler may then feed the list of eligible objects (or files) along with a service profile (among service profiles 138, e.g., determined by logic implemented in the crawler or implemented in decision engine 158) that needs to be applied on the eligible objects as service items to queue manager 136. A crawler in accordance with one or more embodiments of the invention may be configured to scan only metadata without accessing content data, and may advantageously operate with higher efficiency than a conventional "crawler" that is well-known in the art. Further, the crawler according to the invention may classify unstructured data (or files containing unstructured data) according to metadata.

A crawler may perform, for example, one or more of the following action on selected objects: data integrity of filesystems at the object (file) level, nearline, cataloguing (often referred to as shallow or basic classification), and deep parsing. Nearline may involve copying of the object (file) to another location (usually in some location inside one or more filesystems). Cataloguing may involve extracting the user/environmental parameters of selected documents/files present at the remote filesystems and creates a unique fingerprint of the document. Deep parsing may involve analyzing the objects (files) based on a set of keyword-based, regular-expression-based or semantic-based rules.

A crawler may be started by job manager 132 (or a scheduler implemented in or coupled to job manager 132); a crawler may be stopped by job manager 132 (or the scheduler) or may self-terminate based on scheduling specifications. In case of node failure, a crawler may obtain a restart point from queue manager 136. The crawler can be agnostic about the node in which queue manager 136 is running.

In one or more embodiments, a crawler may create one or more checkpoints when the crawler scans a set of files. The checkpoint(s) may provide status information associated with scanning performed by the crawler, such that the crawler may resume the scanning from an appropriate checkpoint after an interruption of the scanning, e.g., caused by shut-down of a data storage device.

The number of crawlers 134 may be adjusted (e.g., increased or decreased) according to the number and/or volume or repositories.

The one or more service profiles 138 may include one or more of basic classification, deep classification, data integrity, database recovery, search index recovery, action(s) (e.g., move, copy, and/or delete), etc. A service profile may define one or more services or orders and combinations of services provided by one or more of service providers 142 for data to be processed. Multiple services may be mixed and matched by a service profile. If the specified service profile requires deep classification, data fetcher 140 may obtain a copy of the selected file(s). If the specified service profile requires only basic classification without requiring deep classification, there may be no need for data fetcher 140 to obtain a copy of the selected file(s).

The one or more service providers 142 may be configured to perform one or more of metadata population, creation of (basic) metadata, database population, rule-based content extraction, transparent migration, policy classification, action(s) (e.g., move, copy, and/or delete), etc. in processing data/file(s). For example, service providers 142 may include a hash and metadata extraction program 162, a basic metadata creation program 166, a search indexing program 164, etc.

System 100 may also include control path modules/programs such as authentication module 146 and policy engine 152.

Authentication module 146 may be configured to authenticate users (utilizing an NFS or CIFS interface) and application servers (utilizing an API). Authentication module 146 may authenticate a user during connection establish time. Authentication module 146 may perform the mapping of user IDs and predefined security IDs into user names. Authentication module 146 may perform authentication by linking and invoking a library, such as in NIS server 150 (Network Information Services server 150, e.g., for UNIX systems) or in active directory server 148 (e.g., for WINDOWS® systems). The library may take the username and password credentials and attempt to authenticate the user against one or more authentication services.

Policy engine 152 may include a management part that stores and manages the policies into a LDAP repository 154 (Lightweight Directory Access Protocol repository 154, or LDAP 154).

Policy engine 152 may also include policy enforcement modules. For example, Policy engine 152 may include one or more of the following enforcement modules: an access control enforcer (ACE) module, a parsing rules module, a search policy module, etc.

The ACE module may be configured to enforce one or more of access control rights, file retention policies, WORM (write-once-read-many), etc. The ACE module may interfaces with CIFS, APIs (application interfaces), etc.

The parsing rules module may employ document parsing rules (managed by policy engine 152) in LDAP 154 to extract relevant information from documents. These parsing rules may be based on at least one of keyword, regular expression, Boolean logic, and advanced content analytics. An option to have full-content extraction also may be provided.

The search policy module may perform the lookup to identify whether a particular user should view the search results of a search query. The search policy module may interface with a search engine.

The implementation of policy engine 152 may be based one or more concepts, such as the categorization of information based on the content, the actions (or services) associated with different policy groups, etc.

System 100 may employ rules to identify and categorize the content data in an enterprise/organization. The rules may be arbitrary regular expressions along with one or more actions (or services) specified. Each rule can be assigned a name. Different set of rules may be applicable to different set of objects. The actions (or services) that can be specified utilizing policy engine 152 (or a rule engine) may include key-value pairs.

Policy engine 152 may be configured to categorize data into different buckets. The categorization may be useful for identifying contents that need regulatory compliance. For example, a rule may be that any document with content of "social security number" or "SSN" or "xxx-xxx-xxxx" where x is a digit [0, 9] should be categorized as HIPAA (Health Insurance Portability and Accountability Act). This rule may be formulated as a regular expression, and the action (or service) may be specified to map the group to appropriate regulatory policy in metadata.

The rules may be stored in LDAP 154. A parser engine may download the one or more of the rules before parsing any file. The content of the file may then be matched with the specified rule, and appropriate memberships may be assigned.

Policy engine 152 may also define a policy group (including one or more rules) in metadata. A policy group may represent an abstraction that stores the enforcement rules applicable for a given policy group. For example, HIPAA may correspond to 7 year enforcement with rigid ACLs (Access Control Lists) specific to the organization, and SEC (Securities and Exchange Commission) may have 5 year enforcement with loose deletion requirement. Furthermore these regulatory requirements may change over time. Therefore, the metadata of each object stores the policy group it belongs to, but the consequence of belonging to this group is maintained in the policy grouping information in LDAP 154.

The enforcement modules (e.g., the ACE module, the parsing rules module, and the search policy module) consult the requirements and take appropriate action on the object at appropriate time.

System 100 may also include housekeeping modules such as a system services module, a system log module, an error propagation module 156 (for propagating error information across the nodes), etc.

FIG. 2A shows a schematic representation illustrating an arrangement 200 for facilitating data discovery in accordance with one or more embodiments of the present invention. Arrangement 200 may include one or more components of system 100 illustrated in the example of FIGS. 1A-1B and/or components similar to components of system 100. Arrangement 200 may also include functions and actions associated with the components. In one or more embodiments, arrangement 200 may include a file crawler 202, a data fetcher 204, a file processing program 206, and a search indexing program 208 to perform data discover tasks. As an example, file crawler 202, data fetcher 204, file processing program 206, and search indexing program 208 may represent file/email crawler 168, data fetcher 140, one or more of service providers 142 (such as hash and metadata extraction program 162 and/or basic metadata creation program 166), and search indexing program 164, respectively, illustrated in the example of FIG. 1B. In one or more embodiments, the components may operate on the same batch (or set) of data/files sequentially. In one or more embodiments, the components may operate on different batches (or sets) of data/files simultaneously. Different batches of files may include the same amount of files or different amount of files. As an example, a first set of files may include a first quantity of files, and a second set of files may include a second quantity of files that is different from the first quantity of files. The sizes of the batches may be dynamic. For example, the first quantity of files may change over time.

For regulating operating speeds to overcome potential problems caused by speed mismatch, one or more of the components may providing "backpressure" (or resistance) to one or more preceding components that perform one or more preceding tasks. For example, crawler 202 may select multiple sets/batches of files to be processed (each set/batch of files including one or more files), but data fetcher 204 may resist against and/or delay obtaining a copy of one or more of the selected files, as illustrated by backpressure 214 applied to crawler 202 in the example of FIG. 2A. Advantageously, the operating speeds of crawler 202 and data fetcher 204 may be coordinated, and potential dropping of files and/or potential latency caused by speed mismatch may be prevented.

As illustrated in the example of FIG. 2A, crawler 202 may select at least batch 1 (or a first set of files), batch 2 (or a second set of files), batch 3 (or a third set of files), and batch 4 (or a fourth set of files) to be processed. Each of batch 1, batch 2, batch 3, and batch 4 may be stored in one or more data sources 250, which may include, for example, one or more data sources and/or data storage devices on network 102 illustrated in the example of FIG. 1A. Data fetcher 204 may obtain a copy of batch 1, a copy of batch 2, and a copy of batch 3 for subsequent processing. However, data fetcher 204 may resist against and/or delay obtaining a copy of batch 4, e.g., until data fetcher 204 and/or one or more following components that perform subsequent data discovery actions are ready and/or have sufficient capacity to perform responsible data discovery actions. In one or more embodiments, data fetcher 204 may notify file crawler 202 when data fetcher 204 is ready to obtain a copy of the next set of files, batch 4, thereby enabling file crawler 202 to adjust the scanning/crawling speed accordingly.

As another example, file processing program 206 may resist against and/or delay processing one or more of the copies of files obtained by data fetcher 204, as illustrated by backpressure 216 applied to data fetcher 204 in the example of FIG. 2A, for coordinating speeds of data fetcher 204 and file processing program 206, thereby preventing potential file dropping and/or potential latency. As illustrated in the example of FIG. 2A, although data fetcher 204 may have obtained a copy of each of batch 1, batch 2, and batch 3, file processing program 206 may process only the copy of batch 1 and the copy of batch 2. File processing program 206 may resist against and/or delay processing the copy of batch 3 until file processing program 206 and/or one or more following components that perform subsequent data discovery actions are ready and/or have sufficient capacity to perform responsible tasks. In one or more embodiments, file processing program 206 may notify data fetcher 204 when file processing program 206 is ready to perform one or more services on the copy of batch 3, thereby enabling data fetcher 204 to adjust the data-fetching speed accordingly and/or enabling data fetcher 204 to timely provide the copy of batch 3 to file processing program 206 for processing.

In one or more embodiments, file processing program 206 may extract metadata from the copy of batch 1 and the copy of batch 2 for facilitating subsequent search indexing. In one or more embodiments, file processing program 206 may generate hash codes utilizing the content of the tiles in the copy of batch 1 and the copy of batch 2. The hash codes may be utilized to identify files, such that files having the same content may be identified by the same hash code even if the files have different filenames and/or different metadata. As a result, duplication of data discovery actions on the same content data may be prevented. Advantageously, data discovery efficiency may be substantially improved, and/or cost associated with performing data discovery may be reduced.

As another example, search indexing program 208 may resist against and/or delay generating any search index using one or more of the files that have been processed by file processing program 206, as illustrated by backpressure 218 applied to file processing program 208, for coordinating speeds of file processing program 206 and search indexing program 208, to prevent potential file dropping and/or potential latency. As illustrated in the example of FIG. 2A, although file processing program 206 has processed the copy of batch 1 and the copy of batch 2, search indexing program 208 may resist against and/or delay generating any search index using the copy of batch 2 until search index program 208 (and/or one or more following components that perform subsequent data discovery actions) are ready and/or have sufficient capacity to perform responsible tasks. In one or more embodiments, search indexing program 208 may notify file processing program 206 when search indexing program 208 is ready to generate a search index using the copy of batch 2, thereby enabling file processing program 206 to adjust the file-processing speed accordingly and/or enabling file processing program 206 to timely provide the copy of batch 2 to search indexing program 208 for search indexing.

Incorporating "backpressure" or resistance, arrangement 200 enables file crawler 202, data fetcher 204, file processing program 206, and search indexing program 208 to operate in a coordinated fashion. Advantageously, no files or very few files may be dropped between data discovery tasks, and users' data discovery needs may be satisfied without significant latency experienced by the users.

FIG. 2B shows a table illustrating examples of conditions under which "backpressure" or resistance is provided in facilitating data discovery in accordance with one or more embodiments of the present invention.

As illustrated in the example of FIG. 2B, conditions of backpressure associated with file crawler 202 may include condition 222, which may include long file paths. For example, with reference to the example of FIG. 2A, file crawler 202 may resist against scanning batch 4 when one or more file path lengths associated with one or more files of batch 3 exceed a file path length threshold. Additionally or alternatively, condition 222 may include one or more long file paths. For example, file crawler 202 may resist against scanning batch 4 when one or more filer lengths associated with one or more files of batch 3 exceed a filer length threshold. Each of the thresholds may be predetermined or may be dynamically updated according to status of components involved in performing data discovery tasks.

As also illustrated in the example of FIG. 2B, conditions of backpressure associated with data fetcher 204 may include condition 224, small files and/or many files. For example, with reference to the example of FIG. 2A, data fetcher 204 may resist against obtaining the copy of the batch 4 when one or more file sizes associated with one or more files of batch 1, batch 2, and/or batch 3 are smaller than a file size threshold. As another example, data fetcher 204 may resist against obtaining the copy of batch 4 when one or more file sizes associated with one or more files of batch 4 are smaller than a file size threshold. As another example, data fetcher 204 may resist against obtaining the copy of batch 4 when one or more amounts of files of batch 1, batch 2, and/or batch 3 exceed a file quantity threshold. As another example, data fetcher 204 may resist against obtaining the copy of batch 4 when an amount of files of batch 4 exceeds a file quantity threshold.

As also illustrated in the example of FIG. 2B, conditions of backpressure associated with file processing program 206 may include condition 226, difficult file formats. For example, with reference to the example of FIG. 2A, file processing program 206 may resist against performing any services on the copy of batch 3 when one or more file formats associated with one of more files of batch 1 and/or batch 2 do not belong to a predetermined set of readily-recognizable file formats. As another example, file processing program 206 may resist against performing any services on the copy of batch 3 when one or more file formats associated with one of more files of batch 3 do not belong to a predetermined set of readily-recognizable file formats.

As also illustrated in the example of FIG. 2B, conditions of backpressure associated with search indexing program 208 may include condition 228, amount of text to index. For example, with reference to the example of FIG. 2A, search indexing program 208 may resist against generating any search index from the copy of batch 2 when the amount of text to index in batch 1 exceeds a text amount threshold. As another example, search indexing program 208 may resist against generating any search index from the copy of batch 2 when the amount of text to index in batch 2 exceeds a text amount threshold.

As can be appreciated from the foregoing, embodiments of the present invention may include an integrated system for facilitating/performing data discovery and may incorporate "backpressure" in the data discovery workflow to prevent potential speed mismatch issues. As a result, various data discovery tasks may be performed in a coordinated manner. Advantageously, no files or very few files/data may be dropped between data discovery tasks, and users' data discovery needs may be effectively satisfied without significant latency experienced by the users; less storage space may be required to create a copy of all the collected data (e.g., collected data for legal processing); much less time is needed for data discovery since the integrated system is adaptive in nature with very few manual steps; end-to-end auditing and chain of custody are much more accurate since the collection, processing, analysis, review, and production may all be performed on the single integrated system; and the users of the data need to be trained on only one tool such that learning is simplified for the users.

Embodiments of the invention may generate hash codes utilizing content data of files and may utilize the hash codes to identify files, such that files having the same content may be identified by the same hash code even if the files have different filenames and/or different metadata. As a result, duplication of data discovery actions on the same content data may be prevented. Advantageously, data discovery efficiency may be substantially improved, and/or cost associated with performing data discovery may be reduced.

Embodiments of the invention may incorporate checkpoints for providing at least status information associated with scanning performed by crawlers. The crawlers may resume the scanning from the checkpoint after an interruption of the scanning, for example, caused by shut-down of a data source (e.g., a data storage device), without repeatedly scanning data that has been previously scanned. Advantageously, data discovery efficiency and/or cost may be optimized.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A system for facilitating data discovery on a network, the network having one or more data storage devices, the system comprising:
   a crawler program configured to scan files stored on the one or more data storage devices, and identify a first set of files and a second set of files as being relevant, the scanning and the identifying being performed at a crawler operating speed, the crawler program being further configured to delay scanning based on at least one of the following conditions: (1) a file path length associated with one or more files in the first set of files exceeds a file length threshold; and 2) one or more filer lengths associated with one or more files of the of the first set of files exceed a filer length threshold;
   a data fetcher program configured to receive a location of the first set of files identified by the crawler program, the location being on the one or more data storage devices, and copy the first set of files from the received location at a data fetcher operating speed, the data fetcher program being further configured to delay copying the second set of files, thereby causing the crawler program to adjust the crawler operating speed of the scanning and the identifying according to the data fetcher operating speed based on at least one of the following conditions: (1) a file size associated with a file in the second set of files is smaller than a file size threshold, (2) a quantity of files in one of the first set and the second set of files exceeds a file quantity threshold, (3) a file format associated with a file of one of the first set and the second set of files does not belong to a predetermined set of file formats, and (4) an amount of text to index in the first set of files exceeds a text amount threshold; and
   circuit hardware implementing one or more functions of one or more of the crawler program and the data fetcher program.

2. The system of claim 1 wherein the crawler program is further configured to create at least a checkpoint when the crawler program scans the first set of files, the checkpoint providing at least status notification of scanning performed by the crawler program, the crawler program resuming the scanning from the checkpoint after an interruption of the scanning.

3. The system of claim 1 wherein a quantity of files in the first set of files is different from a quantity of files in the second set of files.

4. The system of claim 1 wherein a quantity of files in the first set of files changes over time.

5. A system for facilitating data discovery on a network, the network having one or more data storage devices, the system comprising:
   a crawler program configured to scan files stored on the one or more data storage devices, and identify a first set of files, a second set of files, a third set of files, and a fourth set of files as being relevant, the scanning and the identifying being performed at a crawler operating speed, the crawler program being further configured to delay scanning the fourth set of files based on at least one of the following conditions: (1) a file path length associated with one or more files in the third set of files exceeds a file length threshold; and 2) one or more filer lengths associated with one or more files of the of the third set of files exceed a filer length threshold;
   a data fetcher program configured to receive a location of the first set of files identified by the crawler program, the location being on the one or more data storage devices, and copy the first set of files, a copy of the second set of files, and a copy of the third set of files from the received location at a data fetcher operating speed, the data fetcher program being further configured to delay copying the fourth set of files, thereby causing the crawler program to adjust crawler operating speed of the scanning and the identifying according to the data fetcher operating speed based on at least one of the following conditions: (1) a file size associated with one or more files of the first set, the second set and the third set of files is smaller than a file size threshold, (2) one or more quantities of files in one of the first set, second set and third of files exceeds a file quantity threshold, (3) a file format associated with a file of one of the first set, second set and third set of files does not belong to a predetermined set of file formats, and (4) an amount of text to index in one of the first set, second set and third set of files exceeds a text amount threshold;
   a processing program configured to perform one or more services on the copy of the first set of files and the copy of the second set of files, the processing program being further configured to delay performing any services on the copy of the third set of files;
   a search indexing program configured to generate at least a search index using the copy of the first set of files, the search indexing program being further configured to delay generating any search index from the copy of the second set of files; and
   circuit hardware implementing one or more functions of one or more of the crawler program, the data fetcher program, the processing program, and the search indexing program.

6. The system of claim 5 wherein the one or more services include extracting metadata from at least one of the copy of the first set of files and the copy of the second set of files.

7. The system of claim 5 wherein the one or more services include generate at least a hash code using data contained in at least one of the copy of the first set of files and the copy of the second set of files.

8. The system of claim 5 wherein the crawler program delays scanning the fourth set of files when one or more file path lengths associated with one or more files of the third set of files exceed a file path length threshold.

9. The system of claim 5 wherein the data fetcher program is further configured to notify the crawler program that the data fetcher is ready to obtain the copy of the fourth set of files after the data fetcher has delayed obtaining the copy of the fourth set of files.

10. The system of claim 5 wherein the processing program is further configured to notify the data fetcher program that the processing program is ready to perform at least a service on the copy of the third set of files after the processing program has delayed performing any services on the copy of the third set of files.

11. The system of claim 5 wherein the processing program delays performing any services on the copy of the third set of files when one or more file formats associated with one of more files of at least one of the first set of files and the second set of files do not belong to a predetermined set of file formats.

12. The system of claim 5 wherein the processing program delays performing any services on the copy of the third set of files when one or more file formats associated with one of more files of the third set of files do not belong to a predetermined set of file formats.

13. The system of claim 5 wherein the search indexing program is further configured to notify the processing program that the search indexing program is ready to generate a search index from the copy of the second set of files after the search index program has delayed generating any search index from the copy of the second set of files.

14. The system of claim 5 wherein the search indexing delays generating any search index from the copy of the second set of files in at least one of a first condition and a second condition, the first condition being that an amount of text to index in the first set of files exceeds a first text amount threshold, the second condition being that an amount of text to index in the second set of files exceeds a second text amount threshold.

15. A method for facilitating data discovery on a network, the network having one or more data storage devices, the method comprising:
   scanning files stored on the one or more data storage devices, and identifying a first set of files and a second set of files as being relevant, the scanning and the identifying being performed by a crawler program at a crawler program operating speed, the crawler program being configured to delay scanning based on at least one of the following conditions: (1) a file path length associated with one or more files in the first set of files exceeds a file length threshold; and 2) one or more filer lengths associated with one or more files of the of the first set of files exceed a filer length threshold;
   receiving, by a data fetcher program, a location of the first set of files identified by the crawler program, the location being on the one or more data storage devices; and
   copying the first set of files from the received location at a data fetcher operating speed, the data fetcher program being configured to delay copying the second set of files, thereby causing the crawler program to adjust the crawler operating speed of the scanning and the identifying according to the data fetcher operating speed based on at least one of the following conditions: (1) a file size associated with a file in the second set of files is smaller than a file size threshold, (2) a quantity of files in one of the first set and the second set of files exceeds a file quantity threshold, (3) a file format associated with a file of one of the first set and the second set of files does not belong to a predetermined set of file formats, and (4) an amount of text to index in the first set of files exceeds a text amount threshold.

16. The method of claim 15, further comprising creating at least a checkpoint when the crawler program scans the first set of files, the checkpoint providing at least status notification of scanning performed by the crawler program, the crawler program resuming the scanning from the checkpoint after an interruption of the scanning.

17. The method of claim 15 wherein a quantity of files in the first set of files is different from a quantity of files in the second set of files.

18. The method of claim 15 wherein a quantity of files in the first set of files changes over time.

19. A computer program product comprising computer-readable program code to be executed by one or more processors when retrieved from a non-transitory computer-readable medium, the program code including instructions to:
   scan files stored on the one or more data storage devices, and identify, by the crawler program, a first set of files and a second set of files as being relevant, the scanning and the identifying being performed by a crawler program at a crawler program operating speed, the crawler program being configured to delay scanning based on at least one of the following conditions: (1) a file path length associated with one or more files in the first set of files exceeds a file length threshold; and 2) one or more filer lengths associated with one or more files of the of the first set of files exceed a filer length threshold; and
   receive, by a data fetcher program, a location of the first set of files identified by the crawler program, the location being on the one or more data storage devices;
   copying, by the data fetcher program, the first set of files from the received location at a data fetcher operating speed, the data fetcher program being configured to delay copying the second set of files, thereby causing the crawler program to adjust the crawler operating speed of the scanning and the identifying according to the data fetcher operating speed based on at least one of the following conditions: (1) a file size associated with a file in the second set of files is smaller than a file size threshold, (2) a quantity of files in one of the first set and the second set of files exceeds a file quantity threshold, (3) a file format associated with a file of one of the first set and the second set of files does not belong to a predetermined set of file formats, and (4) an amount of text to index in the first set of files exceeds a text amount threshold.

20. The computer program product of claim 19, the program code including further instructions to create at least a checkpoint when the crawler program scans the first set of files, the checkpoint providing at least status notification of scanning performed by the crawler program, the crawler program resuming the scanning from the checkpoint after an interruption of the scanning.

21. The computer program product of claim 19 wherein a quantity of files in the first set of files is different from a quantity of files in the second set of files.

22. The computer program product of claim 15 wherein a quantity of files in the first set of files changes over time.

* * * * *